United States Patent Office 3,518,202

Patented June 30, 1970

3,518,202
STABILIZED 1,1,1-TRICHLOROETHANE COMPOSITION

Leighton S. McDonald, Angleton, Tex., assignor to The Dow Chemical Company, Midland, Mich., a corporation of Delaware No Drawing. Filed Dec. 29, 1967, Ser. No. 694,416
Int. Cl. C09d 9/00
U.S. Cl. 252—171 7 Claims

ABSTRACT OF THE DISCLOSURE 1,1,1-trichloroethane stabilized with minor amounts of 4,7-dihydro-1,3-dioxepin($O-CH_2 \cdot O \cdot CH_2 \cdot CH{:}CH \cdot CH_2$)

in combination with nitromethane and/or propargyl alcohol and a lower alkylene oxide having from 3 to 5 carbon atoms which may contain a chlorine atom. The invention also relates to a process for preventing deterioration of 1,1,1-trichloroethane in contact with the metals aluminum, zinc, iron or copper or their alloys which comprises maintaining in intimate admixture with such 1,1,1-trichloroethane and metals a stabilizing amount of 4,7-dihydro-1,3-dioxepin in combination with nitromethane and/or propargyl alcohol and a lower alkylene oxide.

The present invention relates to a new and useful composition of matter and more particularly relates to a stabilized 1,1,1-trichloroethane composition suitable for use in contact with metals and to a process for degreasing metals such as aluminum, iron, copper, zinc and their alloys.

It is now well established that 1,1,1-trichloroethane is a very useful and highly versatile industrial solvent. It is likewise well known that 1,1,1-trichloroethane is the most readily degradable of the chlorinated hydrocarbons when in contact with aluminum and that such degradation occurs whether the solvent is hot or cold and whether the metal contact occurs in the vapor or liquid phases. It is further well known that the 1,1,1-trichloroethane stabilized against the aluminum reaction is unstable in the presence of zinc. In order for the art to enjoy the benefits of this highly useful and versatile solvent, there is a continuing need to find substances which will stabilize 1,1,1-trichloroethane in the presence of metals, particularly aluminum and zinc.

It is therefore an object of this invention to provide a stabilized 1,1,1-trichloroethane composition. A further object of this invention is to provide a method whereby 1,1,1-trichloroethane can be prevented from deteriorating in the vapor phase when in contact with aluminum and zinc. A still further object of the present invention is to provide a composition of matter useful in degreasing metals, particularly aluminum and zinc. These and other objects and advantages of the present invention will become apparent on the reading of the following detailed specification.

BRIEF ABSTRACT OF INVENTION

In accordance with the present invention, 1,1,1-trichloroethane is stabilized by the addition thereto of a stabilizer system containing from about 2 to about 10% by volume of 4,7-dihydro-1,3-dioxepin and from about 0.25 to about 2% of either or both nitromethane and propargyl alcohol and from 0.25 to about 2% of a lower alkylene oxide having from 3 to 5 carbon atoms which may also contain chlorine, particularly epichlorohydrin or butylene oxide. A total concentration of from about 2.5 to about 6 volume percent of such stabilizers has generally been found to be preferable. At concentrations below about 2 volume percent of the stabilizer system, the effectiveness of such stabilizer begins to decrease rapidly. Concentrations in excess of 10% may be employed but no additional advantage is gained by employing such higher concentrations.

The compositions of this invention are excellent solvents, useful as carrier vehicles for other organic materials and as liquid solvents to remove oil, grease and the like from metal parts. Such solvent compositions may be used hot or cold in the presence of substantially any metal without any substantial amount of metal-induced solvent decomposition occurring.

The stabilized 1,1,1-trichloroethane composition of this invention is easily recovered by distillation of the common expedient employed to remove impurities, after use as a carrier vehicle or oil and grease solvent. The inhibitors are recovered simultaneously with the 1,1,1-trichloroethane and the stabilized solvent is therefore usually available for reuse with little or no additional stabilizer needed.

The following examples are provided to further illustrate the invention but are not to be construed as limiting to the scope thereof.

EXAMPLE 1

A series of tests were run employing 65 ml. of uninhibited 1,1,1-trichloroethane in an Erlenmeyer flask, into which was placed strips of 1100 aluminum, 24S aluminum, 1010 steel, 70/30 brass, zinc, 2½ inches by ½ inch, so as to expose ½ of each strip to the liquid and the other ½ to the vapors. Various amounts of 4,7-dihydro-1,3-dioxepin, propargyl alcohol and/or butylene oxide were added and the flask placed on a hot plate regulated to maintain the liquid at its boiling point. A reflux condenser was fitted to the flask to condense the vapors and return the condensate to the boiling liquid. The flasks and contents were maintained under reflux conditions on a 24-hour basis, observations being made twice daily. The tests were terminated when the metals showed signs of reaction or the solvent discolored markedly. The results of the various tests are set forth in tabular form in the following table.

| Percent by Volume | | | Length of Text (Hrs.) | Remarks |
|---|---|---|---|---|
| 4,7-dihydro-1,3-dioxepin | Propargyl Alcohol | Butylene Oxide | | |
| 4 | 1.0 | 0.25 | 168 | Solvent slightly discolored; no change in 100 hours. |
| 4 | 0.5 | 1.0 | 168 | Zn has several pin-point spots on surface below liquid; solvent straw colored; Zn coloration change in 24 hours. |
| 4 | 0.5 | 0.5 | 168 | Zn has pin-point deposits in liquid and vapor; 1010 steel has streaks of discoloration, spotted slightly in 24 hours. |
| 4 | 0.5 | 0.25 | 168 | Solvent has black coloration; Al has pin-point spots in section in vapor; clear after 24 hours. |
| 4 | 0.25 | 0.5 | 168 | Solvent has black coloration; 24S Al shows several black pin-points; O.K. up to 24 hours, coloration change slight at 48 hours, slowly increasing. |

To illustrate the efficacy of the inhibitors of the present invention when employed in amounts within the scope of the present invention, a series of runs were made employing identical procedures as outlined in Example 1 employing various of the inhibitors alone and in combinations outside the scope of the present invention. The results of these runs are tabulated below along with the results set forth above for comparative purposes.

| Percent by Volume | | | Length of Text (Hrs.) | Remarks |
|---|---|---|---|---|
| 4,7-dihydro-1,3-dioxepin | Propargyl Alcohol | Butylene Oxide | | |
| 4 | | | 72 | Aluminum strip completely disappeared in 72 hours, reaction started in vapor and once commenced moved into solvent liquid; solvent turned black; O.K. up to 48 hours. |
| 4 | 0.5 | | 168 | Zn black; solvent black; all strips stained; Zn yellowed—brass spotted in 24 hours. |
| 4 | | 0.5 | 24 | Al disappeared—reaction started in vapor; solvent black; all strips stained. |
| | 0.5 | | 0 | Al reacted before reflux temperature reached. |
| | | 0.5 | 0 | Al reacted before reflux temperature achieved. |
| | 0.5 | 0.5 | 24 | Al reacted within 24 hours; solvent black. |

EXAMPLE 2

A series of tests were run employing 65 ml. of uninhibited 1,1,1-trichloroethane in an Erlenmeyer flask, into which was placed strips of No. 11 aluminum, 24S aluminum, 1010 steel, 70/30 brass, zinc, 2½ inches by ½ inch, so as to expose ½ of each strip to the liquid and the other ½ to the vapors. Various amounts of 4,7-dihydro-1,3-dioxepin, nitromethane and/or butylene oxide were added and the flask placed on a hot plate regulated to maintain the liquid at its boiling point. A reflux condenser was fitted to the flask to condense the vapors and return the condensate to the boiling liquid. The flasks and contents were maintained under reflux conditions on a 24-hour basis, observations being made twice daily. The tests were terminated when the metals showed signs of reaction or the solvent discolored markedly. The results of the various tests are set forth in tabular form in the following table.

| Percent by Volume | | | Length of Test (Hrs.) | Remarks |
|---|---|---|---|---|
| 4,7-dihydro-1,3-dioxepin | Nitromethane | Butylene Oxide | | |
| 4 | 0.25 | 1.0 | 168 | Slight discoloration of solvent and strips; no sign of deterioration of solvent or strips. |
| 4 | 0.25 | 0.5 | 168 | Do. |
| 4 | 0.25 | 0.25 | 168 | Slight discoloration of solvent and strips; Zn lost its brightness; no deterioration of solvent or strips. |
| 4 | 0.5 | 0.25 | 168 | Slight discoloration of solvent and strips; no sign of deterioration of solvent or strips. |
| 4 | 0.5 | 1.0 | 168 | Do. |
| 4 | 0.5 | 0.5 | 168 | Do. |
| 2 | 0.5 | 0.5 | 168 | Do. |

In a like manner, a test was run employing only 0.5% by volume nitromethane as the inhibitor. The aluminum reacted in the solvent before it was placed on the hot plate. In another test employing 4% of the dioxepin and 1% nitromethane, the solvent discolored to scale 10 on APHA scale, the strips were all stained during the 168-hour test.

It is to be understood that like results as above set forth in Examples 1 and 2 can be obtained by substituting for the 4,7-dihydro-1,3-dioxepin substituted dioxepins of the generic formula $$(\overline{O-CH_2\cdot O\cdot CH_2\cdot CH:CH\cdot C}R_2)$$

wherein each R may be a lower alkylene radical having from 1 to 4 carbon atoms or the two R's may be joined together to form with the carbon atom of attachment a six-membered cyclic moiety of the cyclo aliphatic or phenyl configuration.

I claim:

1. A stabilized composition of 1,1,1-trichloroethane consisting essentially of from about 2.0 to about 10% by volume 4,7-dihydro-1,3 dioxepin, 0.25 to about 2% by volume of an agent selected from the group consisting of nitromethane, propargyl alcohol and mixtures thereof and 0.25 to about 2% by volume of an agent selected from the group consisting of lower alkylene oxides having from 3 to 5 carbon atoms and epichlorohydrin.

2. The composition of claim 1 wherein the combined stabilizers are present in an amount of from about 2.5 to about 5 volume percent.

3. A method for preventing the deterioration of 1,1,1-trichloroethane in contact with metals comprising maintaining in intimate admixture with said 1,1,1-trichloroethane while in contact with said metals from about 2.0 to about 10% by volume of 4,7-dihydro-1,3-dioxepin, 0.25 to about 2% by volume of a member selected from the group consisting of nitromethane, propargyl alcohol and mixtures thereof and from 0.25 to 1.0% of a lower alkylene oxide having from 3 to 5 carbon atoms.

4. A stabilized composition of 1,1,1-trichloroethane consisting essentially of 2% by volume 4,7 dihydro-1,3 dioxepin, 0.5% by volume nitromethane and 0.5% butylene oxide.

5. A stabilized composition of 1,1,1-trichloroethane consisting essentially of 4% by volume 4,7 dihydro-1,3-dioxepin, 0.25% by volume nitromethane and 0.5% butylene oxide.

6. A stabilized composition of 1,1,1-trichloroethane consisting essentially of 4% by volume 4,7-dihydro-1,3-dioxepin, 0.5% by volume propargyl alcohol and 0.25% butylene oxide.

7. A stabilized composition of 1,1,1-trichloroethane consisting essentially of 4% by volume 4,7-dihydro-1,3-dioxepin, 0.25% by volume propargyl alcohol and 1.0% butylene oxide.

References Cited

UNITED STATES PATENTS 3,128,315 4/1964 Hardies ------------ 252—171

3,326,988 6/1967 Stack -------------- 252—171

MAYER WEINBLATT, Primary Examiner

W. E. SCHULZ, Assistant Examiner

U.S. Cl. X.R.

252—399; 260—652.5